W. SELLERS & J. HARRISON.
Improvement in Child's Sleds.

No. 133,261.  Patented Nov. 19, 1872.

Witnesses.
C. Wahlers.
E. L. Kastenhuber.

Inventors,
William Sellers
James Harrison
p.
Van Santvoord & Hauff
Attys

UNITED STATES PATENT OFFICE.

WILLIAM SELLERS AND JAMES HARRISON, OF NEW YORK, N. Y.

IMPROVEMENT IN CHILDREN'S SLEDS.

Specification forming part of Letters Patent No. 133,261, dated November 19, 1872.

*To all whom it may concern:*

Be it known that we, WILLIAM SELLERS and JAMES HARRISON, both of the city, county, and State of New York, have invented a new and useful Improvement in Children's Sleds; and we do hereby declare the following to be a full, clear, and exact description thereof, which will enable those skilled in the art to make and use the same, reference being had to the accompanying drawing forming part of this specification, in which drawing—

Figure 1:
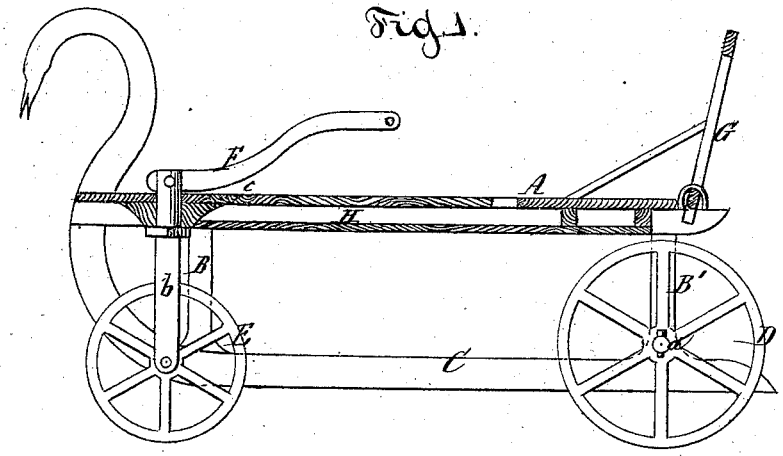
Figure 2:
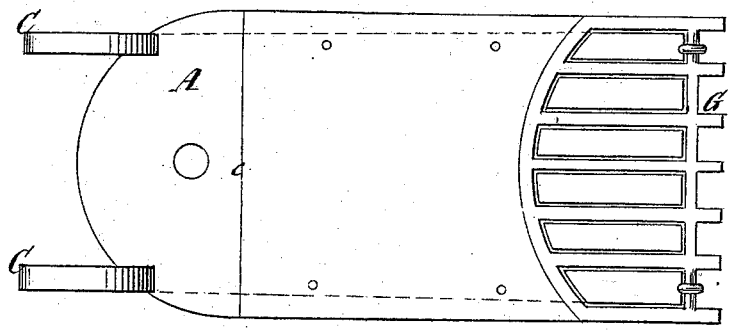

Figure 1 represents a longitudinal vertical section of our invention. Fig. 2 is a plan or top view of the same.

Similar letters indicate corresponding parts.

This invention relates to a child's sled, the runners of which are provided with removable wheels, so that a sled is obtained which can be used the whole year on snow or on the bare ground, or even in a house or room. The hind wheels turn on pins, which are firmly secured on the posts supporting the seat, and the front wheel or wheels are mounted in a post which swivels in a socket in the seat, and to which a tiller is secured for the purpose of steering the sled. The seat is provided with a hinged back-rest, made in the form of a grate, to fit between a corresponding grate in the seat, and in the seat is a receptacle to receive the wheels and the tiller when the sled is rigged up to be used on snow or ice.

In the drawing, the letter A designates the seat of our sled, which connects, by posts or supports B B', with the runners C C. In the inner sides of the rear posts B' are fastened pins $a$, which form the axles for wheels D, and which are provided with transverse holes to receive pins for retaining said wheels. The front wheel E is mounted in a post, $b$, which extends up through a socket in the seat, and in the upper end of which is secured a tiller, F, for the purpose of steering the sled. This tiller is hinged to the posts $b$, so that it can be swung in either direction and that it can be readily removed when it is desired to take off the post with its wheel. If desired, two front wheels may be secured to the post $b$. The seat A is provided with a hinged back-rest, G, which is made in the form of a grate, to fit in a corresponding grate-shaped portion of the seat, so that when said back-rest is turned down the seat presents an even and unbroken surface, (see Fig. 2,) and when the back-rest is turned up it gives a convenient support to the child occupying the sled. In the body of the seat is a receptacle, H, intended to receive the wheels and their attachments when the sled is to be used on snow or ice. This receptacle is provided with a cover that can be readily removed when it is desired to obtain access to the contents of said receptacle, and which is retained in position by a dovetailed groove, $c$, and by steady-pins rising from the body of the seat. By these means a sled is obtained which can be readily arranged for use on snow or ice, or for use on the bare ground, or in a building or house.

What we claim as new, and desire to secure by Letters Patent, is—

1. A sleigh or sled for children, provided with journals or axles for receiving removable wheels, substantially as and for the purpose set forth.

2. A sleigh or sled provided with rear and front wheels adapted to be removed, in combination with a tiller, F, substantially as described.

3. The hinged grate-shaped back-rest, in combination with a corresponding grate-shaped recess in the seat of a sled, substantially as described.

4. The receptacle H in the seat of a child's sled, said receptacle being provided with a cover, which is retained by a dovetailed groove and steady-pins, substantially as set forth.

This specification signed by us this 19th day of June, 1872.

WILLIAM SELLERS.
    JAMES HARRISON.

Witnesses:
 W. HAUFF,
 E. F. KASTENHUBER.